United States Patent [19]

Anderson

[11] Patent Number: 5,037,140

[45] Date of Patent: Aug. 6, 1991

[54] FIRE SUPPRESSION APPARATUS

[75] Inventor: James R. Anderson, Menominee, Mich.

[73] Assignee: Evergreen Tool Company, Inc., Menominee, Mich.

[21] Appl. No.: 439,857

[22] Filed: Nov. 21, 1989

[51] Int. Cl.$^5$ .............................................. F16L 3/01
[52] U.S. Cl. .................................. 285/161; 285/341; 285/910
[58] Field of Search ............... 285/161, 910, 918, 341; 169/48, 54, 45, 16, 5, 91

[56] References Cited

U.S. PATENT DOCUMENTS

| 1,809,582 | 12/1926 | Church | 285/161 X |
| 2,464,332 | 3/1949 | Maund et al. | 285/30 |
| 2,816,949 | 12/1957 | Curtiss | 174/51 |
| 3,667,783 | 6/1972 | Sotolongo | 285/161 |
| 4,145,075 | 3/1979 | Holzmann | 285/81 |
| 4,498,692 | 2/1985 | Swanson | 285/20 |
| 4,728,420 | 3/1988 | Abercia | 285/161 X |

Primary Examiner—Dave W. Arola
Assistant Examiner—Heather Chun
Attorney, Agent, or Firm—Michael, Best & Friedrich

[57] ABSTRACT

A fire suppression fitting for mounting a conduit extending through an opening in a supporting surface. The fitting includes a main body with threaded ends and a longitudinally disposed bore. The conduit is slideably received through the bore. The fitting further includes a gasket, a lock washer and an anchoring nut. The anchoring nut secures the main body on the supporting surface and the gasket in sealing engagement around the supporting surface opening. The coupling further includes a compression nut and a compression gasket, the compression nut selectively urges the compression gasket into sealing fire impeding relation around the conduit.

5 Claims, 1 Drawing Sheet

FIRE SUPPRESSION APPARATUS

BACKGROUND OF THE INVENTION

The present invention relates to fire suppression systems and, more particularly to a coupling for securing a fire suppression supply conduit to a supporting surface through which the fire suppression supply conduit extends. The conduit fitting produces a seal around the fire suppression supply conduit and prevents flames from penetrating the supporting surface from a fire that may occur, for example, under or in the hoods and ducts in commercial kitchen ventilation systems.

The benefits of automatic fire suppression systems to suppress or prevent the spread of fire in environments such as a commercial kitchen have long been known. Such common automatic sprinkler systems include dry chemical (sodium bicarbonate), liquid agent (metallic salt solutions), $CO_2$, and water sprinklers. Among the features which these systems have in common is the use of a supply conduit to convey a fire suppressant medium to the discharge nozzle. In a typical application such as for a kitchen grill where the chances of a fire occurring are considerably above average, the automatic system is normally installed with the individual nozzle heads mounted in the high risk areas, that is, the exhaust hoods positioned over the grill, or in the ducts which are connected to the exhaust hoods. Such a typical automatic system has a source of fire suppressant medium which is remotely located from sprinkler heads or discharge nozzles which dispense the fire suppressant medium. The supply conduit normally passes through the wall of a hood or duct to connect the supply of fire suppressant to the sprinkler heads. In such an arrangement, the supply conduit passes through the wall of the exhaust hood or duct at a penetration point. In the event of a fire in the exhaust hood or duct, it is important for the prevention of spread of the fire and that the fire be contained within the hood or duct and not be allowed to escape through the penetration points of the supply conduits. Further, it is important to contain any grease ladened air or liquid grease within the ventilating system structure such that this material cannot leak to the back side of the hood during the normal course of ventilator system operation. Such leakage, were a fire to occur, could cause a fire to be communicated outside the confines of the ventilating system, e.g., on the back side of the hood, by autoignition of the grease on the hot ventilating system surfaces. Various solutions have been proposed to solve this problem. For example, a welded joint, or a joint providing a permanent weld-like seal, have been utilized at such penetration points, and are now commonly required by building codes.

The current practice of welding may be an expedient means of addressing this problem and conforming with the assorted building code requirements, but it presents various disadvantages. For example, the installation of a welded joint is normally labor intensive, time consuming, and may result in damage or distortion to the surrounding hood or duct areas. Moreover, repair and/or replacement of the seal is normally extremely difficult, if not impossible.

Therefore, it has long been known that it would be desirable to have a fire resistant support or fitting which supports the conduit passing through the supporting surface, but in a manner which does not have the attendant shortcomings of the prior art devices and practices.

SUMMARY OF THE INVENTION

Therefore, it is a general object of the present invention to provide an improved fire suppression system.

Another general object of this invention is to provide, in one basic coupling structure, a seal around a supporting surface opening and a seal around the conduit passing through the fitting.

Another object of the present invention is to provide an apparatus which has particular utility in sealingly supporting a conduit for passage through a supporting surface in a fire suppression system.

Another object of the present invention is to provide such an apparatus which can be easily installed at the time the conduit is installed.

Another object of the present invention is to provide such an apparatus which is characterized by simplicity of design, ease of employment and installation, facilitates repair and maintenance, and all of which can be achieved in a cost effective manner.

For the achievement of these and other objects and advantages, this invention provides a mechanical, selectively releasable coupling which is effective to seal the point of penetration of the supply conduit through the supporting surface and also to seal around supply conduit as it passes through the coupling. In the preferred embodiment, the coupling has a threaded main body positioned in an opening in the supporting surface and which includes a longitudinally disposed bore which is adapted to receive the conduit for passage through the supporting surface. An anchoring nut threadably engages the threaded main body and secures the threaded main body to the supporting surface while simultaneously compressing a sealing gasket against the supporting surface and around the opening. In addition, a compression nut threadably engages the threaded main body. The compression nut includes a compression seal. The compression nut is operable when it threadably engages the main body to urge the compression seal into sealing engagement around the supply conduit. The invention thus provides a dual seal around the supporting surface opening and around the conduit, in a single unit.

Figure 1:
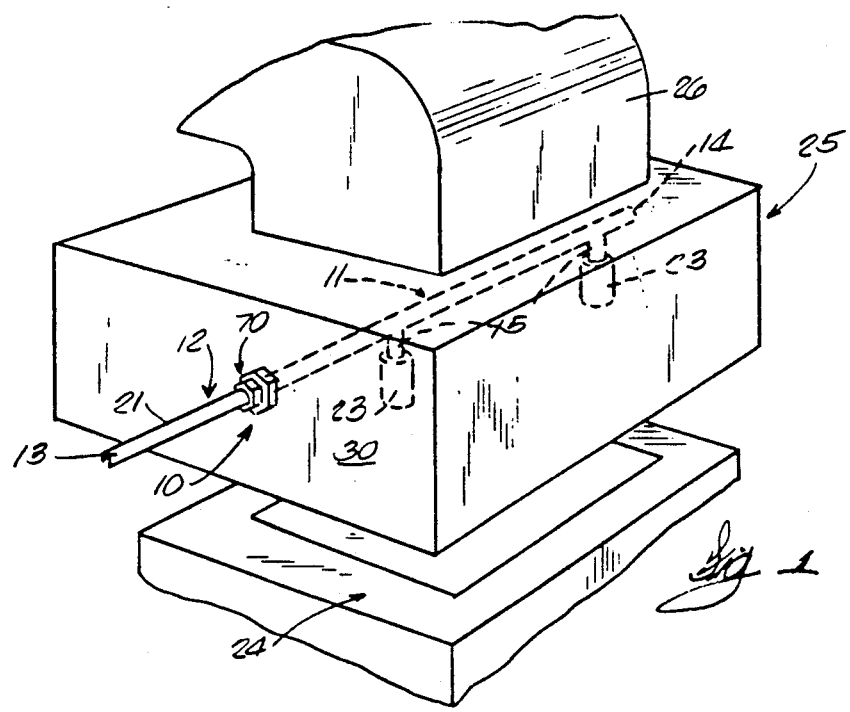
FIG. 1 is a perspective view of a fire suppression system embodying the invention shown in a typical, operational configuration.

Before one embodiment of the invention is explained in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology used herein is for the purpose of description and should not be considered as limiting.

DESCRIPTION OF THE PREFERRED EMBODIMENT

Referring more particularly to the drawings, the coupling apparatus of the present invention is generally indicated by the numeral 10 in FIG. 1. For illustrative convenience, the coupling apparatus 10 is shown and described in a typical operative environment.

More specifically, and as most clearly shown in FIG. 1, the coupling apparatus 10 is shown as an integral part, or subassembly of a fire suppression or sprinkler system which is generally indicated by the numeral 11. The sprinkler system includes a supply conduit 12 which is connected in fluid communication with a source of fire suppressing fluid, not shown, and which further has a first end 13 that extends to the fire suppressant fluid source and a sealed second end, 14. A pair of discharge lines, or conduits 15 are connected in fluid communication with the supply conduit 12.

The supply conduit 12 has opposite inside and outside surfaces 20, and 21 respectively, the inside surface 20 defining a fluid passageway 22 which channels the fire suppressing fluid into the discharge conduits 15. The discharge conduits 15 each have a sprinkler head or discharge nozzle 23, which is individually operable to dispense the fire suppressing fluid in a predetermined pattern onto the grill 24 which is mounted below the individual sprinkler heads 23. The grill 24 is of conventional design and for the sake of brevity will not be discussed in any further detail. An exhaust hood 25 is mounted above the grill and encloses the sprinkler heads 23. The exhaust hood 25 is also of conventional design and will not be described in detail other than to state that it is operable to collect fumes produced as a result of preparing food products on the grill and to vent these same fumes to the outside environment. The hood channels the collected fumes into a duct 26.

The exhaust hood 25 is typically manufactured from stainless steel or other similar substances and includes a substantially vertical wall member or supporting surface 30. The supporting surface 30 includes an outside surface 31, and an opposite, inside surface 32. A circular orifice or aperture 33 having a predetermined diameter is formed in the supporting surface 30 and permits the supply conduit 12 to extend into the exhaust hood 25. The supply conduit 12 is disposed in a substantially normal position relative to the supporting surface 30.

Figure 2:
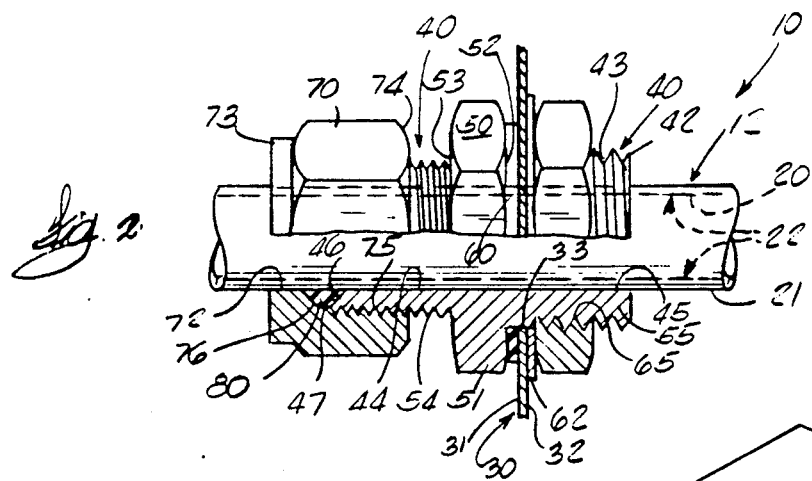
FIG. 2 is a fragmentary view, in partial section of a fire suppression apparatus embodying the invention.
Figure 3:
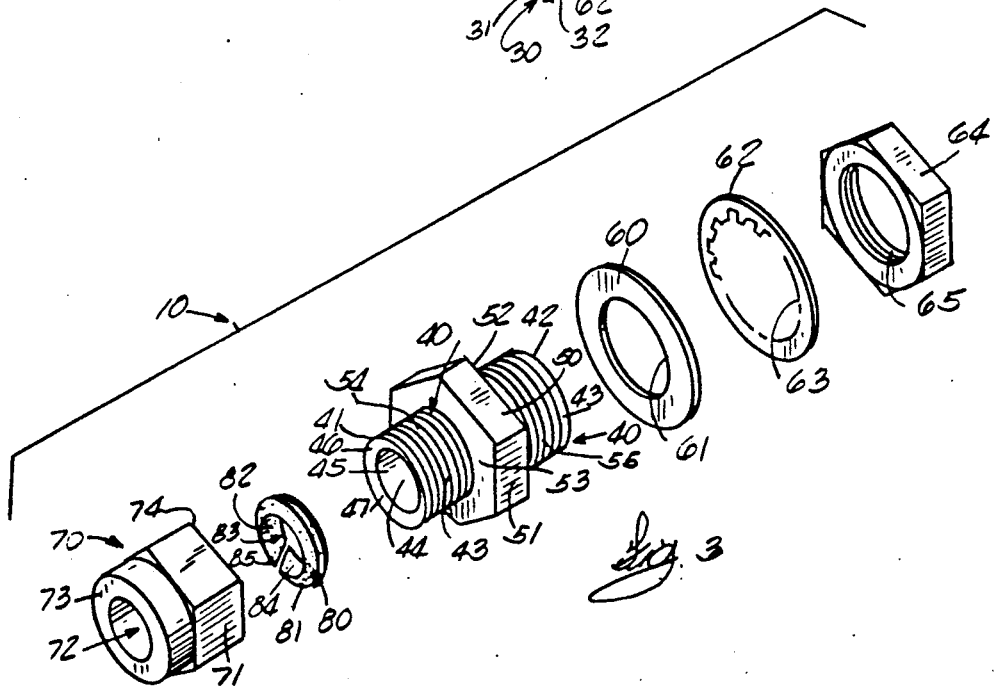
FIG. 3 is a perspective, exploded view of a fire suppression apparatus embodying the invention.

As best shown in FIG. 2, the coupling apparatus 10 includes a substantially cylindrically shaped adaptor or main body 40 which has threaded first and second ends 41 and 42 respectively. The main body 40 has an outside surface 43, which has a predetermined outside diameter. Further, the main body 40 has an inside surface 44 which defines a longitudinally disposed bore 45. The bore 45 has a substantially uniform diameter. As best illustrated in FIGS. 2 and 3, a seat 46 is formed in the first end 41 of the main body 40 and is defined by a supporting surface 47 which is disposed in substantially nonorthogonal relation relative to the inside surface 44.

An integrally formed, substantially hexagonal member 50, is fixed in a position substantially intermediate the first and second ends 41 and 42 respectively. Member 50, which is similar to a nut, includes a hexagonal shaped peripheral edge 51, and inwardly and outwardly facing surfaces 52, and 53, respectively, which are respectively positioned in substantially parallel spaced relation one to the other and which are respectively disposed in substantially radially extending relation relative to the outside surface 43. The nut member 50 separates the main body 40 into a first portion 54 on one side of the nut member 50, and a second portion 55, on the other side of the nut member 50. The first portion 54 includes the first end 41 and the second portion 55 includes the second end 42. As best illustrated in FIG. 2, the outside diameter of the first portion 54 is less than the outside diameter of the second portion 55.

The coupling apparatus 10 also includes a generally circular gasket 60 having a central aperture 61. The central aperature 61 has a diameter which is slightly greater than the outside diameter of the second portion 55. The gasket 60 is manufactured of a resiliant, heat resistant material. Prior to installing the main body 40 on the supporting surface 30, the gasket 60 is slideably received about the second portion 55 of the main body and is positioned in engagement with the inwardly facing surface 52 of the nut 50. After appropriately positioning the gasket, the second portion 55 of the main body 40 is fitted through the orifice 33 thereby positioning the gasket for sealing engagement with the surface 52 and about orifice 33 to achieve a fire impeding seal between the nut 50 and the outside surface 31 of the supporting surface 30.

The coupling apparatus 10 also includes a lock washer 62 for securing the apparatus 10 to the supporting surface 30. The lock washer 62 has a central aperture 63 with a diameter which is just slightly greater than the outside diameter of the second portion 55. The lock washer 62 is slideably received on the second portion 55 of the main body 40 and is positioned in engagement with the inside surface 32 of the supporting surface 30. The lock washer 62 secures the main body 40 in a substantially nonrotatable position on the supporting surface 30.

The coupling apparatus 10 also includes an anchoring nut 64 having a threaded inner surface 65. The anchoring nut 64 is threaded on the second portion 55 of the main body 40 and is effective to secure the main body 40 on the supporting surface 30. When nut 64 is threaded tightly against surface 32 the gasket 60 provides a fire impeding seal around the orifice 33.

After the main body 40 is secured to the supporting surface 30 in the manner as discussed above, the supply conduit 12 can be urged through the bore 45. Prior to positioning the supply conduit 12 in the bore, however, a compression nut 70 is positioned on the supply conduit 12.

The compression nut 70 has a longitudinally disposed bore 72. The compression nut 70 also has a first end 73 and a second end 74. As best illustrated in FIG. 2, the bore 72 has a threaded portion 75 located adjacent to the second end 74 which mates with the first portion 54 of the main body 40. The compression nut has a seat 76 formed in the bore 72 and located at the end threaded portion 75 intermediate the first and second ends 73, 74 of the compression nut 70. The seat 76 is adapted to receive a compression seal 80 at the end of the threaded portion. The c 80 is generally torrodial and has an outer surface 81 which is substantially convexly curved. The compression seal 80 has an inwardly facing generally cylindrical surface 82 which defines a substantially uniform bore 83 having a diameter which is slightly greater than the outside diameter of the supply conduit 12. The compression seal 80 is manufactured of a conventional heat resistant material. The compression seal 80 has a radial section which is split so as to define opposite first and second ends 84 and 85 respectively. The opposite ends 84, 85 are adapted to move relative to one another so as to permit constriction of the compression seal 80 thus allowing reduction of the diameter of the bore 83.

After sliding the compression nut 70 and the compression seal 80 onto the supply conduit 12, the supply conduit is slideably urged through the bore 45, and the compression nut 70 is threaded onto the first portion 54 of the main body 40. As the compression nut 70 is advanced along the first portion 54 of the main body 40, the compression nut urges the compression seal into engagement with the seat 46. Further advancement of the compression nut 70 constricts the compression seal 80 so as to sealingly engage the outside surface 21 of the supply conduit 12. In this fashion, the compression seal 80 seals the supply conduit 12 and provides a fire impeding barrier around the supply conduit 12. As earlier discussed, an effective fire impeding seal is also provided around the fire suppressant conduit 12 at the aperture 33 of the wall 30 structure.

Thus, a coupling apparatus 10 embodying the invention facilitates installation of sprinkler systems and provides a fully dependable and practical means by which a supply conduit may be mounted on a supporting surface and in fire impeding relation thereto. The apparatus further is operable when properly installed to inhibit displacement or misalignment of the sprinkler system upon contraction or expansion of the supply conduit, the apparatus being of both sturdy and dependable construction and relatively inexpensive to manufacture and maintain.

Various features of the invention as set forth in the following claims:

I claim:

1. A fitting for supporting a conduit for fire suppressant material on a supporting surface as part of a fire suppressant system, the fitting comprising
   an opening in the supporting surface adapted to house the conduit, and
   means for mounting support of the conduit at said opening including, an elongated unitary body extending partially in the opening and surrounding the conduit, a first generally annular gasket supported on said body and engaging the supporting surface about said opening, an annular surface on said body engaging said first gasket, first clamping means engaged with said body for selectively clamping said first gasket between said annular surface and said supporting surface and in sealing engagement with said surface around said opening and releasing said first gasket from said sealing engagement and means for locking said first clamping means in said engagement with said body, a compression seal surrounding the conduit and engaged by said body, and second clamping means engaged with and movable relative to said body and said compression seal for selectively urging said compression seal into sealing engagement around said conduit and for releasing said compression seal from sealing engagement around the conduit.

2. A fire suppression system comprising,
   a supporting surface having first and second opposite sides and having a hole therein,
   fire suppression means disposed on said first side of said supporting surface,
   a fire retardant conduit extending through said hole in said supporting surface, and
   fitting means for supporting said conduit and for sealing said conduit and said support surface, said fitting means including a generally cylindrical body having threaded first and second ends, said second end of said body extending through said hole and having therein a longitudinally disposed bore, said bore adapted to receive said conduit, said fitting means also including a nut integrally formed with said body and disposed intermediate said first and second ends, a generally annular gasket of resilient, temperature resistant material, said gasket received on said second end disposed between said nut and said first side of said supporting surface, a lock washer received about said second end and positioned against said second opposite side of said supporting surface, an anchoring nut threaded on said second end of said body and securing said body to said supporting surface, a compression nut threaded on said first end of said body, and a compression seal releasably engaged with said compression nut.

3. The apparatus of claim 2 wherein said bore has a substantially uniform diametral dimension, and wherein a seat is formed in said first end, and wherein said compression nut is operable to urge said compression seal into engagement with said seat thereby moving said compression seal into sealing engagement with said conduit.

4. The apparatus of claim 3 wherein said first and second ends of said main body have predetermined outside diameter, and said outside diameter of said first end is less than said outside diameter of said second end.

5. A fire suppression fitting for sealingly mounting a conduit for penetration of a supporting surface comprising:
   a generally cylindrical main body having threaded first and second ends, said first end defining a seat, said first and second ends having predetermined outside diameters with the outside diameter of said second end being greater than the outside diameter dimension of said first end, said second end extending through the supporting surface, a longitudinally disposed bore having a predetermined diameter adapted to slideably receive the conduit;
   a generally annular member integrally formed with said main body and disposed substantially centrally and extending radially from said main body, said annular member having oppositely facing forward and rearward surfaces;
   a gasket of a resilient, heat resistant material, said gasket slideably received about said second end of said main body and positioned in engagement against said rearwardly facing surface of said annular member, and said heat resistant gasket engaged with one side of the supporting surface;
   a lock washer slideably received about said second end of said main body and engaged with the opposite side of said supporting surface;
   an anchoring nut threaded on said second end of said body and engaged with said lock washer;
   a compression nut including means defining a seat and being threadably engaged with said first end of said main body; and
   a compression seal positioned between said seat of said compression nut and said seat on said first end of said main body, said compression seal in sealing engagement with said seat on said first end of the main body and said compression nut and the conduit so as to provide a fire impeding seal about the conduit.

* * * * *

UNITED STATES PATENT AND TRADEMARK OFFICE
CERTIFICATE OF CORRECTION

PATENT NO. : 5,037,140
DATED : August 6, 1991
INVENTOR(S) : James R. Anderson

It is certified that error appears in the above—identified patent and that said Letters Patent is hereby corrected as shown below:

Column 4, line 59, delete the "c" before "80" and insert ---compression seal--.

Claim 2, Column 6, line 10, after "end" insert --and--.

Signed and Sealed this

Twenty-second Day of December, 1992

Attest:

DOUGLAS B. COMER

*Attesting Officer*    *Acting Commissioner of Patents and Trademarks*